W. C. WARD.
CULTIVATOR.

No. 193,059. Patented July 10, 1877.

Attest.
Harry E. Knight.
Walter Knight.

Inventor.
W. C. Ward
By Knight Bros.
attys.

UNITED STATES PATENT OFFICE.

WILLIAM C. WARD, OF MIDDLETOWN, OHIO, ASSIGNOR OF ONE-HALF HIS RIGHT TO FREDERICK A. KENNEL AND ELI LONG, OF SAME PLACE.

IMPROVEMENT IN CULTIVATORS.

Specification forming part of Letters Patent No. 193,059, dated July 10, 1877; application filed April 23, 1877.

*To all whom it may concern:*

Be it known that I, WILLIAM C. WARD, of Middletown, Butler county, Ohio, have invented a new and useful Improvement in Cultivators, of which the following is a specification:

This is an improved form of those implements in which a pair of double-shovel plows, loosely shackled together, are available for cultivation of both sides, simultaneously, of a row of growing corn, or other crop; and my improvement comprises a peculiar form of shackle-bolt for coupling the cross-bars to the cultivator-frames.

Figure 1:
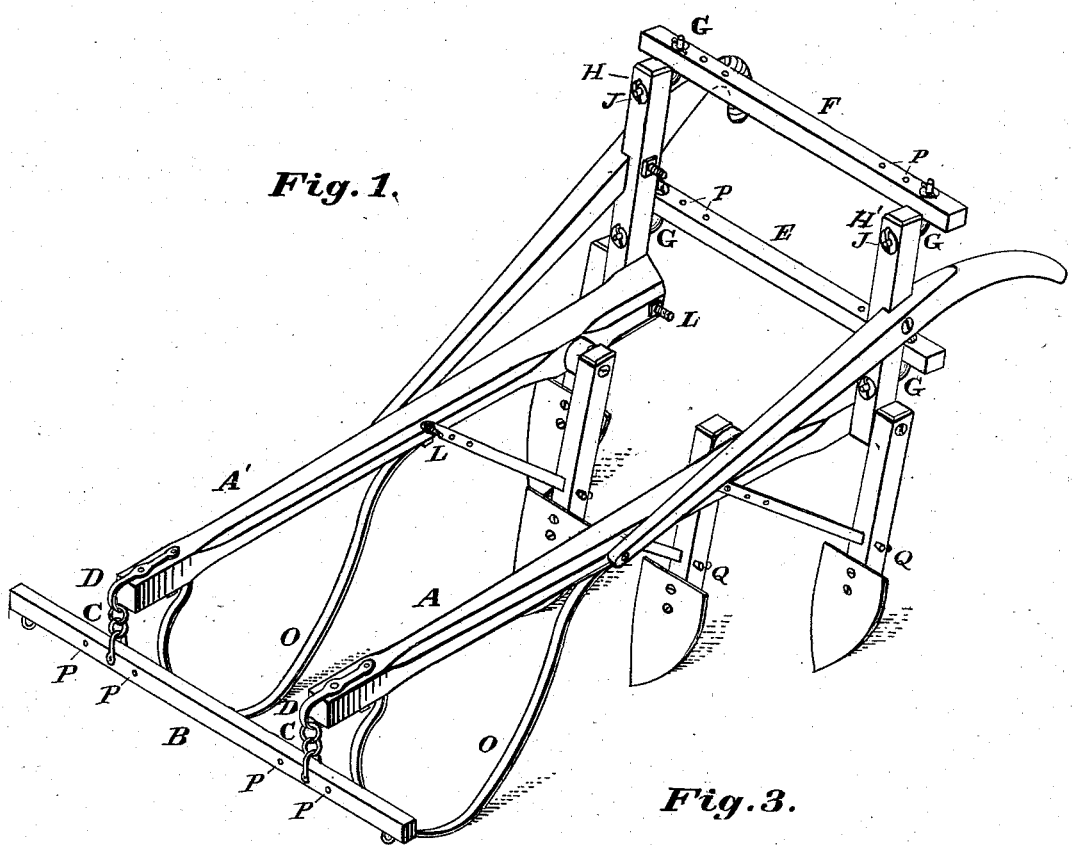
Figure 3:
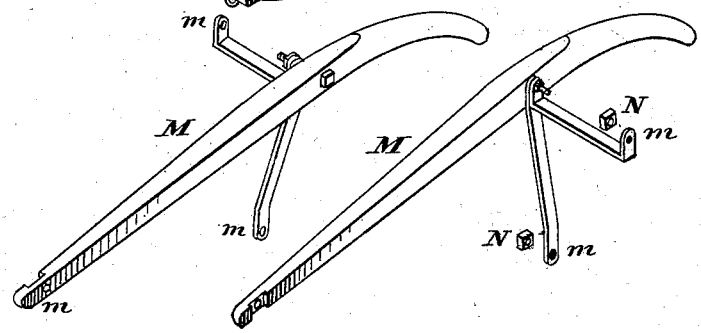
Figure 2:
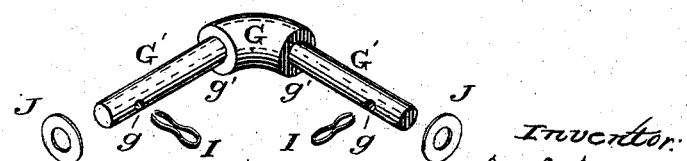

In the accompanying drawings, Figure 1 is a perspective view of a twin or double cultivator embodying my improvements. Fig. 2 represents one of my coupling-links or shackle-bolts on a larger scale. Fig. 3 represents my two extra handles, for use in single cultivation.

A and A' may represent a pair of right and left cultivators, of the customary double-shovel, or any approved form. The said cultivators are loosely coupled in front by means of double-tree B, connected to the front ends of the beams by means of chain-shackles C and clevises D, and at rear by two similar bars or sticks, E and F, whose connection to the rear portions of the cultivator-frames is made by means of a peculiarly-formed curved pivot or shackle bolt, G, whose pins or wrists G' occupy sockets H H' in the cultivator-frames. These wrists have orifices $g$, for the insertion of split keys I, and they have washers J, and shoulders $g'$. These members operate to retain the said wrists in place in their said sockets, while permitting their free rotation therein as in journal-bearings.

Certain of the frame-bolts L are prolonged, as shown, to occupy, when desired, orifices $m$, in my extra handles M, when the two cultivators are to be used independently, said handles being then secured by the application of nuts N to said bolts.

Bolted to the under side of each beam is a bow, O, preferably of steel.

Both double-tree and coupling-bars having a series of orifices, P, for the insertion of the shackles, the implement is thus adapted for either wide or narrow cultivation.

Q represents ordinary wooden break-pins.

The above-described implement is believed to possess several signal advantages over kindred devices; for example:

My peculiarly-formed shackle-bolt G $g$ $g'$, with its described accessories, permits a free and unrestricted play of the two members or cultivators proper, while serving, in conjunction with the double-tree B and coupling-bars E and F, to retain the said members to their proper relative distance.

The implement can be guided with one hand, and, when necessary, can be made to follow a devious route with as much ease as a single cultivator.

In turning, at the end of a through, the operator, not being circumscribed in his route by any wheels, can work the last hill of corn in a row.

By removing the double-tree and hitching the team direct to the clevises, the implement can be successfully employed for straddle cultivation of comparatively high crops, the pair of rear coupling-bars serving to hold the two plows to their proper relative position.

Being without wheels, the implement can be made or repaired by any country blacksmith, while the weight and cost are little more than half of those of the customary wheel-and-tongue double cultivator.

On removing the break-pins and pulling back the shovels, the implement can be made capable of being drawn over the ground like a common sledge.

For stowage or shipment, the withdrawal of a few bolts enables all of the members to be stowed in very compact dimensions, as all can be laid straight out and parallel.

I claim as new and of my invention—

1. The combination, with the perforated frames A H A' H', and bars E F, of the curved shackle-bolt G, having the shoulders $g'$, orifice $g$, key or pin I, and washer J.

2. The shackle device consisting of the curved bolt G $g$ $g'$, key I, and washer J.

In testimony of which invention I hereunto set my hand.

W. C. WARD.

Attest:
 WALTER KNIGHT,
 L. H. BOND.